US009020755B1

(12) United States Patent
Gazit et al.

(10) Patent No.: US 9,020,755 B1
(45) Date of Patent: Apr. 28, 2015

(54) AD-HOC DIFFERENTIAL GPS REFERENCING USING PARKED VEHICLES

(71) Applicant: GM Global Technology Operations LLC, Detroit, MI (US)

(72) Inventors: Ran Y. Gazit, Ra'Anana (IL); Kobi J. Scheim, Pardess Hanna (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/108,468

(22) Filed: Dec. 17, 2013

(51) Int. Cl.
*G01C 21/12* (2006.01)
*G01S 19/01* (2010.01)
*G01C 21/26* (2006.01)

(52) U.S. Cl.
CPC .............. *G01S 19/01* (2013.01); *G01C 21/26* (2013.01)

(58) Field of Classification Search
CPC ..... G01S 17/023; G01S 17/42; G01S 17/936; G01S 10/11; G01S 19/27; G01C 21/12; G01C 21/10
USPC .......... 701/300, 469, 470; 342/357.3, 357.24, 342/457
See application file for complete search history.

(56) References Cited

U.S. PATENT DOCUMENTS

| | | | | |
|---|---|---|---|---|
| 5,438,517 A * | 8/1995 | Sennott et al. | ................. | 701/470 |
| 5,485,385 A * | 1/1996 | Mitsugi | ......................... | 701/472 |
| 5,606,506 A * | 2/1997 | Kyrtsos | .......................... | 701/472 |
| 7,447,573 B2 * | 11/2008 | Hiwatashi et al. | .............. | 701/25 |
| 8,103,208 B2 * | 1/2012 | Cho et al. | ..................... | 455/3.01 |
| 8,103,227 B2 * | 1/2012 | Cho et al. | .................... | 455/127.5 |
| 8,135,077 B2 * | 3/2012 | Cho et al. | ................. | 375/240.27 |
| 8,136,011 B2 * | 3/2012 | Cho et al. | ....................... | 714/758 |
| 8,144,790 B2 * | 3/2012 | Cho et al. | ................. | 375/240.27 |
| 8,165,803 B2 * | 4/2012 | Cho et al. | ...................... | 701/421 |
| 8,315,337 B2 * | 11/2012 | Cho et al. | ....................... | 375/316 |
| 8,755,774 B2 * | 6/2014 | Cho et al. | ................... | 455/414.1 |
| 2009/0248577 A1 * | 10/2009 | Hoj | ................................ | 705/40 |

OTHER PUBLICATIONS

Ohno et al., Outdoor Navigation of a Mobile Robot between Buildings based on DGPS and Odometry Data Fusion, 2003, IEEE, pp. 1978-1984.*

Gu et al., Heading Accuracy Improvement of MEMS IMU/DGPS Integrated Navigation System for Land Vehicle, 2008, IEEE, pp. 1292-1296.*

\* cited by examiner

*Primary Examiner* — McDieunel Marc

(57) ABSTRACT

A method of determining a position of a moving vehicle. A global position is detected by a global positioning device of at least one parked vehicle in a vicinity of the moving vehicle. The global position is determined as a function of signals broadcast by a plurality of satellites. Errors associated with the broadcast signals are determined. A correction error that provides a solution for eliminating the errors associated with the broadcast signals is determined. The correction error is transmitted to the moving vehicle. The correction error is applied to a received global positioning signal received by the moving vehicle. A global position of the moving vehicle is determined as a function of the correction error. The determined global position of the moving vehicle is applied in a vehicle application.

18 Claims, 3 Drawing Sheets

AD-HOC DIFFERENTIAL GPS REFERENCING USING PARKED VEHICLES

BACKGROUND OF INVENTION

An embodiment relates to differential GPS reference stations. Global Positioning System (GPS) or other Global Navigation Satellite System (GNSS) receivers operate by tracking line of sight signals. These receivers typically require at least four or more satellites to be continuously available in an unobstructed line of sight of a satellite receiver on a vehicle. This is due to inherent delay in the signals generated by the satellites as the result of timing signals having some error or delay depending on what interferences the satellite signals may experience before being received by a GPS receiver. Therefore, for a moving vehicle, an absolute global position without errors may be difficult to achieve based solely on signals obtained by the satellites. It is well known that GPS errors may be as great as 30 meters.

SUMMARY OF INVENTION

An advantage of an embodiment is the correction of a global position of a moving vehicle by eliminating errors associated with the satellite signals used for determining the global position of the moving vehicle. The system utilizes an ad-hoc vehicle to vehicle communication system for communicating a correction error signal which provides a solution as to the error associated with the broadcast signals by the satellites. The errors for signals broadcast by a respective set of satellites are initially determined by a parked vehicle that has been stationary for at least a predetermined period of time. The parked vehicle can determine the errors associated with the broadcast signals over time. Since the parked vehicle and the moving vehicle are within a first predetermined distance with respect to one another and since the same signals have passed through essentially the same atmospheric conditions resulting in the same delays, the errors can be identified and a solution in the form of a correction error signal can be applied to the moving vehicle determined position for reducing the positioning error.

Moreover, the other sensing devices can obtain positioning information and can be used in cooperation with GPS data for the parked vehicle for determining the absolute global position of the parked vehicle with minimal error if any.

Furthermore, if the distance between the parked vehicle and the moving vehicle is greater than the first predetermined distance, then the correction error may be communicated to a central processing center which has great computing capability. The central processing center can generate a model, and determine a solution for the area of the moving vehicle based correction error data from various parked vehicles within a second predetermined distance An embodiment contemplates a method of determining a position of a moving vehicle. A global position is detected by a global positioning device of at least one parked vehicle in a vicinity of the moving vehicle. The global position is determined as a function of signals broadcast by a plurality of satellites. Errors associated with the broadcast signals are determined. A correction error that provides a solution for eliminating the errors associated with the broadcast signals is determined. The correction error is transmitted to the moving vehicle. The correction error is applied to a received global positioning signal received by the moving vehicle. A global position of the moving vehicle is determined as a function of the correction error. The determined global position of the moving vehicle is applied in a vehicle application.

DETAILED DESCRIPTION

Figure 1:
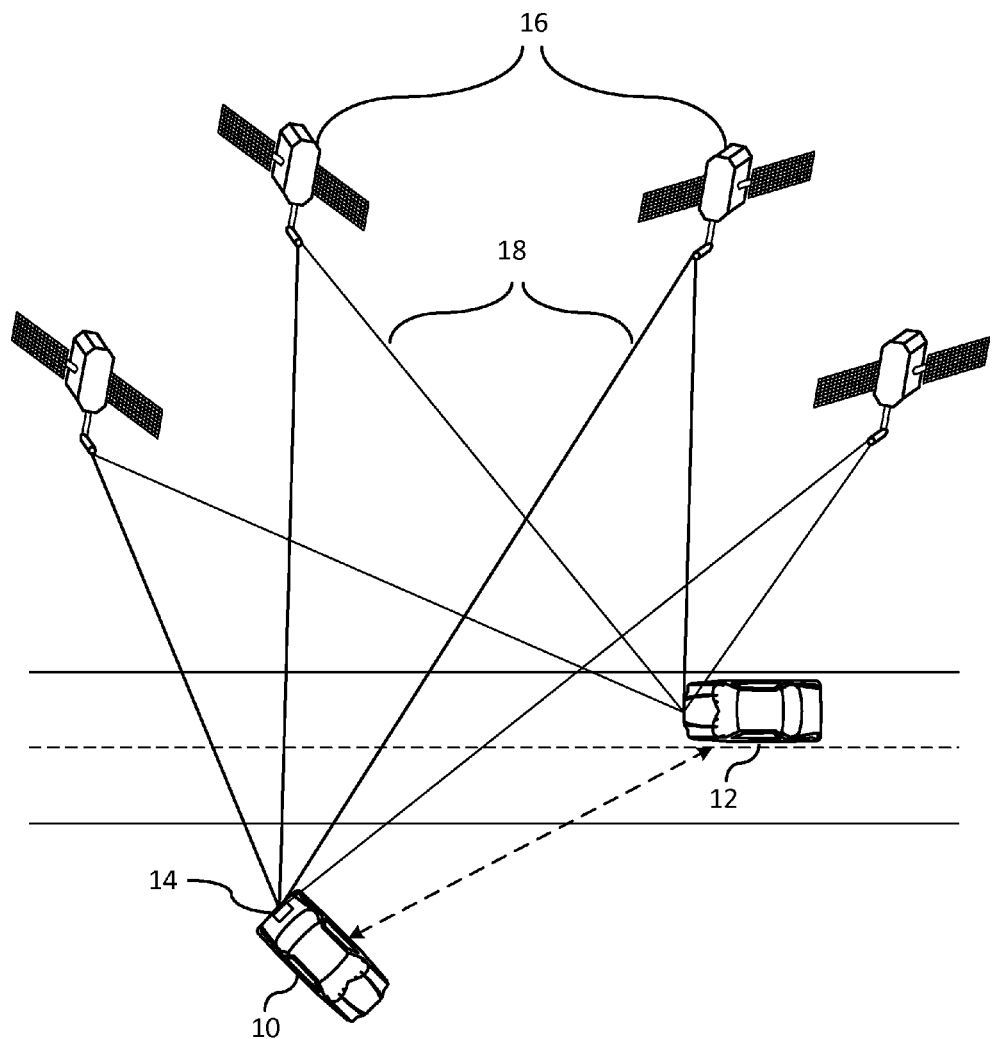
FIG. 1 is a pictorial illustration of a GPS broadcast system for a first embodiment.

FIG. 1 illustrates a parked vehicle 10 and a moving vehicle 12 each having a Global Positioning System (GPS) device 14 that utilizes a constellation of satellites 16 that transmit signals which enable the GPS device 14 within each vehicle to determine its location, speed, direction, and time. The global positioning satellite constellation 16 includes at least twenty-four or more satellites orbiting the earth in a predetermined path of travel continuously transmitting time marked data signals. GPS receivers within the GPS documents receive the transmitted data and use this information to determine its position. By using four or more satellites, a global position can be determined.

GPS receivers operate by tracking line of sight signals which requires that each of the satellites be in view of the GPS receiver. To be accurate, by design, GPS and other GNSS receivers ensure that on average four or more satellites are continuously in the line of sight of a respective receiver on the earth barring any obstructions that may result in a lower number of satellites than that which is required to accurately determine the position of the GPS device 14. The location of a respective GPS device 14 is determined by first comparing the time the signals were transmitted from each of the respective satellites versus the time the signals were recorded and then an attempt is made to correct for some of the errors occurring during transmission. In response to the comparison and the estimates of the location of each satellite using transmitted data, the GPS device 14 calculates how far away each satellite is from the receiving device 14.

Positioning errors that can occur include orbiting errors (i.e., when a satellite's reported position does not match its actual trajectory due to errors or limitations in the models used), poor geometry (i.e., satellites clustered within a narrow region of the sky with respect to the view of the receiver), multi-path signal (i.e., signals reflected off buildings and other objects), and atmospheric delay (i.e., delays occurring when the signals pass through the earth's atmosphere), which result in rate of change errors and timing errors.

To eliminate the errors described herein, a differential global positioning technique is applied that utilizes the cooperation of the GPS device of the moving vehicle 12 and the GPS device 14 of the parked vehicle 10. The parked vehicle 10 as described herein is a vehicle that has been in a stationary position for a predetermined time which would allow the vehicle to determine a fixed position. A parked vehicle 10 staying stationary for the predetermined time allows the parked vehicle to receive periodic satellite signals from each of the satellites so that errors in the received signals may be determined. It is understood that preferably each respective receiver uses timing signals from at least four satellites to establish an absolute global position. Each transmitted signal has some error or delay as a result of some condition acting on the transmitted signal between its transmission from a respective satellite and the reception of the signal at a respective GPS receiver. As stated earlier, sources of errors as the satellite signal descents toward the earth may include satellite clocks errors, ephemeral errors, atmospheric errors, and multi-path errors. To correct the above errors, the stationary vehicle 10 is used as a reference receiver. Since the reference receiver is stationary for at least a predetermined period of time, an accurate and absolute position of the stationary vehicle 10 can be determined where positioning errors in future received signals can be eliminated since stationary vehicle 10 can compute the range errors due to the various delays described above and an absolute position may be determined.

Due to far spatial distance of the satellites in space in comparison to the spatial relationship between a stationary vehicle 10 and a moving vehicle 12 on earth, it can be assumed that if the stationary vehicle 10 and the moving vehicle 12 are within a first predetermined distance from one another (e.g., 1 kilometer), the received signals at both the stationary vehicle 10 and the moving vehicle 12 from a same satellite will be virtually identical. This is due to the fact that the satellite signals transmitted to each respective vehicle with a respective vicinity travels through essentially the same atmospheric condition at the same time and therefore will virtually have identical errors.

As a result, the errors as determined by the stationary vehicle 10 can be provided to the moving vehicle 12 which can then determine its solution, herein referred to as a correction error, to compute its own position using the correction errors supplied by the stationary vehicle 10.

FIG. 1 illustrates each of the plurality of satellites 16 broadcasting global positioning signals 18. The broadcasted signals 18 are received by the stationary vehicle 10 and the moving vehicle 12. Each respective vehicle calculates its global position based on the received global position signals broadcast by the plurality of satellites. The parked vehicle 10, being stationary for at least a predetermined period of time (e.g., at least ten minutes), allows the GPS receiver of the stationary vehicle 10 to determine the ranging errors associated with the satellite signals. The correction error is determined and is transmitted to the moving vehicle 12. The moving vehicle 12 receives the correction error transmitted by the stationary vehicle 10 and utilizes the correction error to correct the errors in its own global position determination so long as the moving vehicle 12 and the stationary vehicle 10 are within the first predetermined distance of one another, which may be referred to as a local area. It should be understood that the stationary vehicle 10 will consume power when the vehicle is parked and the ignition is off. Therefore, a cycling program may be utilized to cycle the power on and off the obtaining satellite signals, determining the range error associated with the satellites, and for broadcasting the correction error signals to the vehicles. In this mode, the stationary vehicle can store the fixed position in its on board memory such that in the next power on cycle the initial position calculation phase can be omitted and corrections can be provided as soon as the satellite signals are received. Therefore, the correction transmission will be available to the moving vehicles within seconds from the power on time at each cycle.

Figure 2:
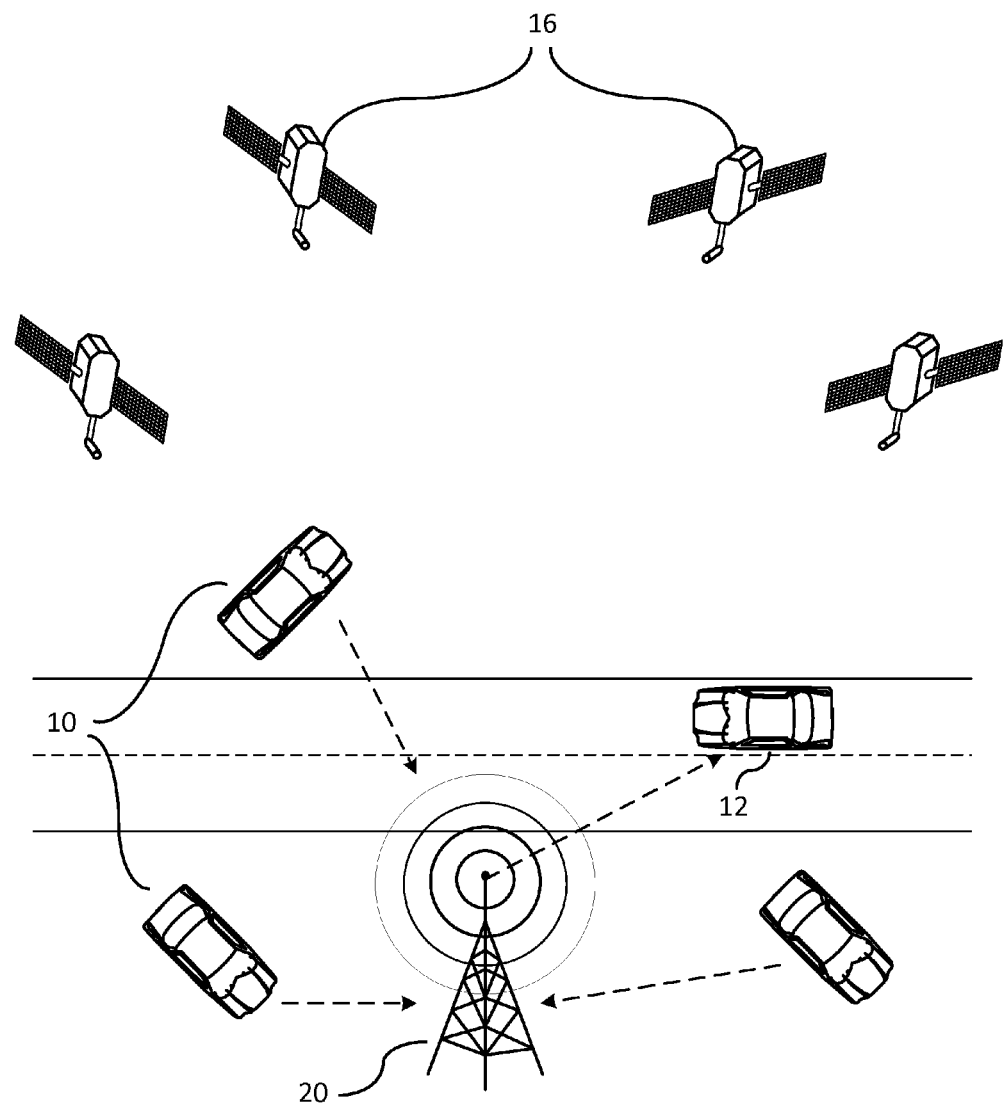
FIG. 2 is a pictorial illustration of a GPS broadcast system for a second embodiment.

FIG. 2 illustrates a correction error solution when the distances between the stationary vehicle 10 and the moving vehicle 12 are substantially greater than the first predetermined distance, hereinafter referred to as a wide area. The wider area solution may be utilized when the distance between the stationary vehicle 10 and the moving vehicle 12 is substantially greater than the first predetermined distance (e.g., 1 kilometer) and less than the second predetermined distance (e.g., 20 kilometers). It is understood that the communication signals from the satellites to the vehicles, as shown in FIG. 1, are not shown in FIG. 2 for clarity purposes to reduce congestion in the drawings; however, it should be understood that the broadcast signals are still being communicated even though not shown.

In FIG. 2, a plurality of parked vehicles 10, as well as the moving vehicle 12 receive signals from the plurality of satellites 16. It should be understood that although a plurality of stationary vehicles are shown, the technique described herein may be utilized for one stationary vehicle without deviating from the scope of the invention. The plurality of vehicles 10 transmits their global position and ranging errors to a central processing center 20. An example of a central processing center 20 may include, but is not limited to, OnStar® that is a subscription-based communications service currently offered on vehicles manufactured by General Motors that provides service that include, but are not limited to, in-vehicle security, remote diagnostics systems, and turn-by-turn navigation via a vehicle-based communication unit that provides a wireless communication link between the vehicle and the remote infrastructure 16. Remote services, such as Onstar®, have sufficient computing devices with processing power capability and large memory storage capability to execute statistical and analytical routines for determining a correction error solution for the wide area described herein. The central processing center 20 may obtain ranging error data from each of the stationary vehicles 10. The central processing center 20 computes a model of the global positioning errors in the wide area. A correction error solution is determined for the ranging errors, and the central processing center 20 transmits the parameters of that model to each of the moving vehicles within the relevant area.

In addition to relying solely on the global position signals from satellites, other sensing devices may be used to improve the estimated position of a parked vehicle. Other sensing devices may include positioning data obtained wirelessly from other sources (e.g., internet, cellular, V2X communications), vision-based devices, neighboring vehicles, charging stations for electric/hybrid vehicles, parking identifiers (e.g., parking meters). Each of the above devices may be utilized in cooperation with the global positioning data from the plurality of satellites by fusing the information together.

Figure 3:
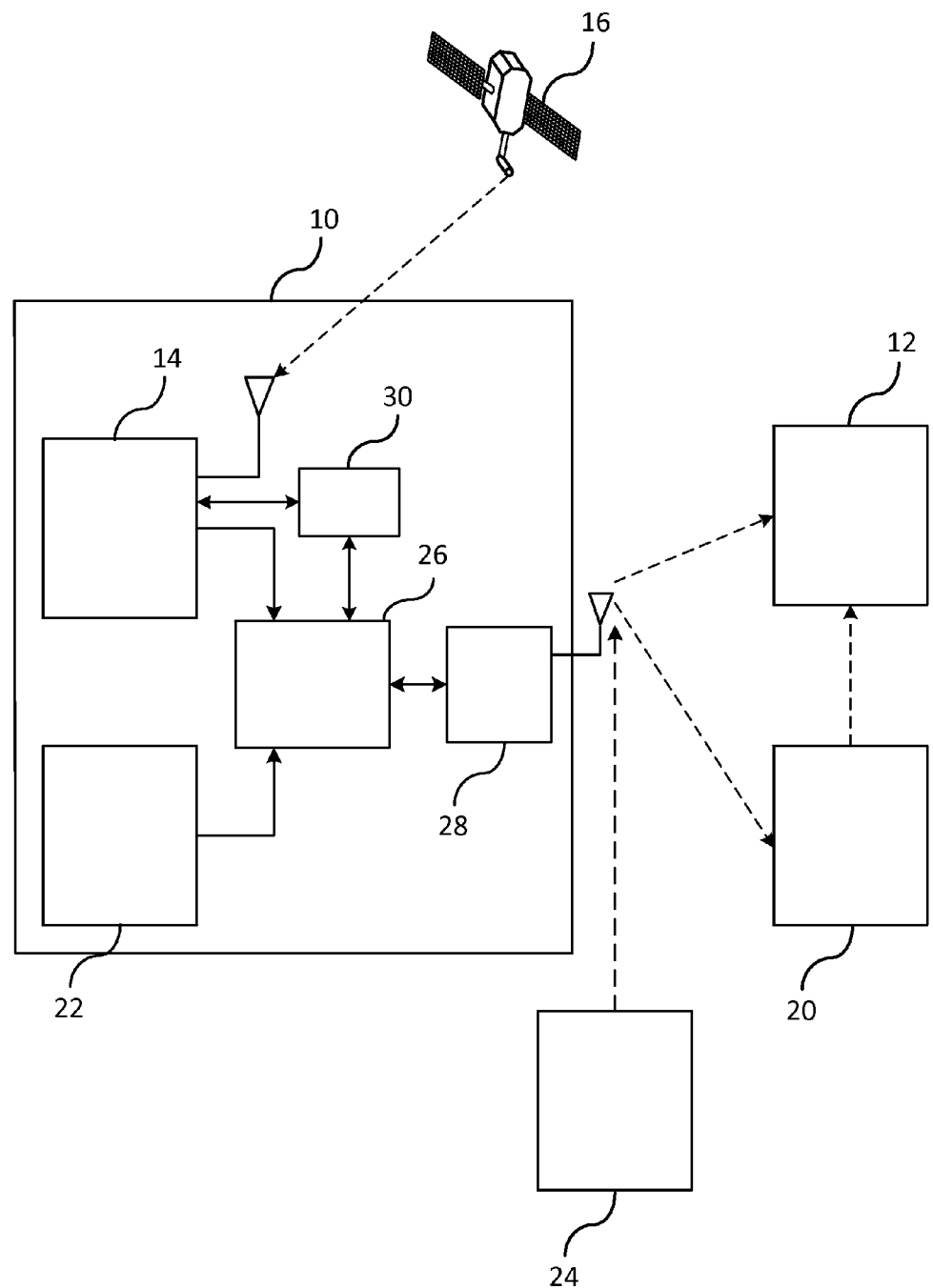
FIG. 3 is a block diagram exemplary block diagram obtaining a corrected global position of a moving vehicle.

FIG. 3 represents an exemplary block diagram for obtaining and fusing the position information received from different sources. The stationary vehicle 10 includes the GPS device 14. The GPS device 14 includes a receiver for obtaining global positioning data from the plurality of satellites 16. One or more in-vehicle sensing devices 22 (e.g., image capture device, radar sensor, lidar sensor) obtains positioning data relating to its position relative to an exterior object, which is preferably a fixed landmark. The term fixed landmark is an exterior object that has a fixed global position that does not move. One or more exterior devices 24 (e.g., parking meter, charging station) may be used to communicate data that assists in identifying its position relative to fixed known positions.

The global positioning data from the satellites 16 as well as the data from the in-vehicle device 22 and the exterior device 24 is provided to a fusion module 26 via a vehicle-based communication unit 28 where the data is cooperatively fused for enhancing a determination of the position of the stationary vehicle 10 and for determining a correction error for the satellite signals. It should be understood that the fusion module 26 may be a separate processor or may integrated into the processor of the GPS device 14. The vehicle-based communication unit 28 transmits the correction error to the moving vehicle 12 for enhancing its global position determination.

Alternatively, the vehicle-based communication unit 28 may transmit the information to the central processing center 20 where a correction error for the wide area is determined and the central processing center 20 broadcasts the correction error signal to other vehicles in the region. A memory 30 may be utilized for storing position information from the GPS or fusion module that is used to determine future correction errors. The memory 30 may be a standalone memory or a shared memory from another device.

It should be understood that the communication lines shown in the drawings are for illustrative purposes of identifying the flow of information as described herein; however, it is understood that the different communication entities are capable of communicating with one another other than the direction of the communication shown in the drawings. For example the central processing center and the moving vehicles are capable of transmitting messages and data to the parked vehicle.

While certain embodiments of the present invention have been described in detail, those familiar with the art to which this invention relates will recognize various alternative designs and embodiments for practicing the invention as defined by the following claims.

What is claimed is:

1. A method of determining a position of a moving vehicle comprising:
    detecting a global position by a global positioning device of at least one parked vehicle in a vicinity of the moving vehicle, the global position determined as a function of signals broadcast by a plurality of satellites;
    determining errors associated with the broadcast signals;
    determining a correction error that provides a solution for eliminating the errors associated with the broadcast signals;
    transmitting the correction error to the moving vehicle;
    applying the correction error to a received global positioning signal received by the moving vehicle:
    determining a global position of the moving vehicle as a function of the correction error;
    applying the determined global position of the moving vehicle in a vehicle application.

2. The method of claim 1 wherein the at least one vehicle determines the correction error for each satellite signal received.

3. The method of claim 2 wherein the correction error determined for each satellite signal received is transmitted to the moving vehicle, wherein the transmitted signal to the moving vehicle includes an identification of the satellite and an associated correction error.

4. The method of claim 3 wherein the correction error is transmitted from the at least one parked vehicle directly to the moving vehicle.

5. The method of claim 2 wherein the correction error determined by the at least one parked vehicle is utilized for each satellite if the moving vehicle is within a predetermined distance of the at least one parked vehicle.

6. The method of claim 5 wherein the predetermined distance is less than substantially 1 kilometer.

7. The method of claim 1 wherein the at least one parked vehicle is at a fixed position for a predetermined period of time before determining and transmitting the correction error.

8. The method of claim 1 wherein the correction error includes timing errors.

9. The method of claim 8 wherein the correction error includes rate of change errors.

10. The method of claim 9 wherein the moving vehicle interpolates the global position as a function of the timing errors and rate of change errors.

11. The method of claim 1 wherein further comprising the step of transmitting the correction error by the at least one parked vehicle to a central processing center.

12. The method of claim 11 further comprising the steps of:
    computing a model, by the central processing center, of the correction errors for an area of travel of the moving vehicle; and
    transmitting the corrections errors determined by the model to the moving vehicle.

13. The method of claim 12 wherein the correction error determined by the at least one parked vehicle is utilized for each satellite if the moving vehicle is within a predetermined distance of the at least one parked vehicle.

14. The method of claim 13 wherein the predetermined distance is less than substantially 20 kilometers.

15. The method of claim 1 further comprising the step of obtaining position data from additional sensors of the at least one parked vehicle, wherein the positional data from the additional sensing devices is cooperatively used with the global position by the global positioning device for determining the correction error.

16. The method of claim 1 further comprising the steps of cycling the power of the at least one parked vehicle on and off for receiving the broadcast signals by the satellites and for broadcasting the correction error.

17. The method of claim 1 wherein the correction error is determined during an initial position calculation phase during an initial power on cycle.

18. The method of claim 17 wherein the initial position calculation phase is omitted for successive power on cycle phases, wherein the correction error is determined immediately upon receipt of the broadcast signals by the plurality of satellites during each successive power on cycle, and wherein the correction error is transmitted to the moving vehicle upon determination of the correction error during each successive power on cycle.

* * * * *